No. 630,958. Patented Aug. 15, 1899.
J. WILSON.
SETTLING DEVICE.
(Application filed May 12, 1898.)
(No Model.)
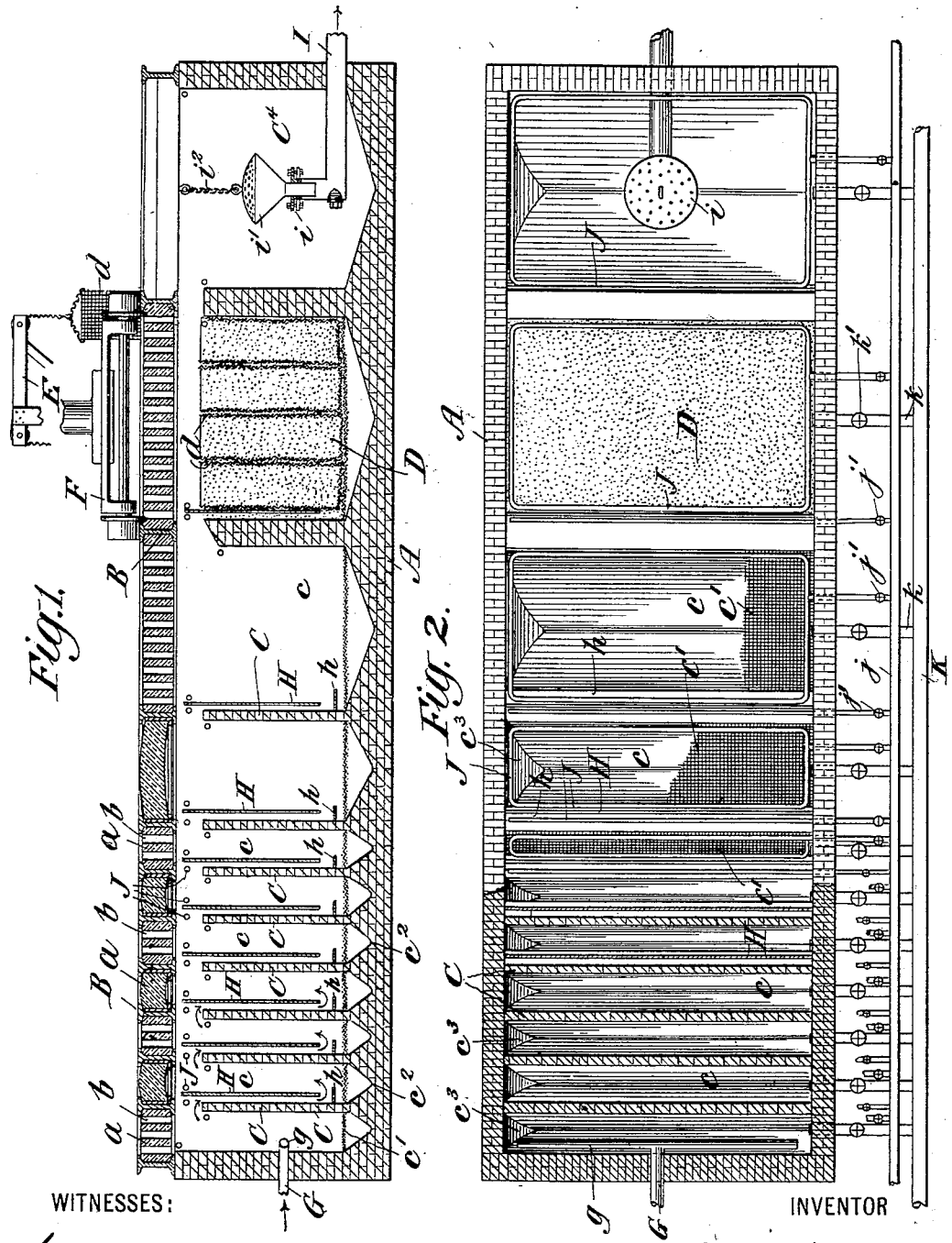

UNITED STATES PATENT OFFICE.

JOHN WILSON, OF NEW YORK, N. Y.

SETTLING DEVICE.

SPECIFICATION forming part of Letters Patent No. 630,958, dated August 15, 1899.

Application filed May 12, 1898. Serial No. 680,436. (No model.)

*To all whom it may concern:*

Be it known that I, JOHN WILSON, a citizen of the United States, residing at the city of New York, (Brooklyn,) in the county of Kings and State of New York, have invented certain new and useful Improvements in Settling Devices, of which the following is a specification.

My invention relates to a settling device for use in filtering.

I will describe a settling device embodying my invention and then point out the novel features in the claims.

In the drawings, Figure 1 is a vertical longitudinal sectional view of a settling device. Fig. 2 is a top view thereof, partly in horizontal section.

A represents a suitable tank, the side walls and bottom of which are preferably of masonry. A top for preventing the wind disturbing the water or other liquid being filtered may be provided, which is supported by I-beams B. These beams are suitably arranged, and the ordinary hollow blocks or tiles $a$ used in building constructions are supported between some of the beams. Glass or lenses $b$ may also be supported between the other I-beams to permit the sun's rays to act on the water. Partition-walls C, of masonry, are provided on the interior of the tank to form compartments $c$, which vary in size, and the bottoms $c^2$ of these compartments are preferably channel-shaped and slightly raised at one end, so that a better drain may be afforded when they are flushed. The raised end may also be curved, as shown at $c^3$.

In some of the compartments $c$ and at the lower part thereof are a number of screens $c'$ of any suitable material and supported in any desired manner. The purpose of these screens is to hold any impurities that may settle below them and prevent the water flowing through the compartments from disturbing such impurities. Sand D is placed in a chamber or chambers preceding the final chamber of the device for the purpose of filtering the water before it enters the final chamber $c^4$. A convenient way of supplying the sand to these chambers is by means of screen or perforated boxes $d$, which are lowered into and raised out of the chambers by means of a crane E, carried by a car or truck F, traveling on the I-beams.

Water is supplied to the first chamber by means of the pipe G, carrying a perforated pipe $g$ within and extending the whole length of the chamber. The water flows from this chamber over the wall C against a board or partition H, provided in the adjacent compartment. A similar partition is provided in each of the succeeding chambers with the exception of the last, and each of the said partitions extends downward nearly to the screen placed at the bottom of each chamber. These partitions, in connection with the walls C, form passages for the water. Between the end of each partition and screen a deflector-board $h$, at right angles to the partition, is provided to change the direction of the current of water in the passages, and thus prevent it striking directly onto the screen. In the chamber containing the filtered water a pipe I is provided, having a stuffing-box $i$ at its end, and working in the stuffing-box is a funnel $i'$, having a perforated or screen cover. This funnel is adapted to be raised or lowered in the stuffing-box by a chain or other device $i^2$.

The operation is as follows: Water is supplied to fill the several compartments and afterward to maintain a slow circulation through them. The impurities and sediment contained in the water, owing to the slow circulation and direction of the current in each compartment, will sink and pass through the screen and remain in the channel-bottoms of the compartments. Any sediment or impurities that may not be separated from the water are caught and retained by the sand before the final chamber is reached. Toward the end of the tank or receptacle the compartments are of a larger size, so that the current will be slower in these compartments, and thus permit of a final separation of the impurities and sediment from the water in these chambers.

For flushing the several compartments I provide a number of coils of pipe J in the upper part of the tank, which coils are arranged to flush the partition-walls and the deflector-plates.

$j$ represents a supply-pipe for the several coils.

K represents a common discharge-pipe for each chamber, and leading from the pipe to one end of the channel-bottoms of the compartments are a number of short pipes $k$. Valves $j'$ and $k'$ are provided in the supply and discharge pipes, respectively.

I claim as my invention—

1. A settling device for filtering, comprising a tank in which are provided a number of compartments, through which the liquid flows successively, and screens located near the bottom of said compartments, over which the liquid flows, substantially as described.

2. A settling device for filtering, comprising a tank in which are provided a number of partition-walls to form compartments, through which the liquid flows successively, a screen located near the bottom of each compartment, so as to have a space below it in which impurities are held, a partition-board in each compartment adjacent the partition-wall to form a passage, and a deflector-board at the end of the passage so formed, whereby the water will flow from one compartment through said passage and over the screen, substantially as described.

3. A settling device for filtering, comprising a tank in which are provided a number of compartments through which water flows successively, each of said compartments being provided with a channel-bottom, screens located above each of said bottoms, suitable means for flushing said compartments and suitable means for effecting a discharge from the bottom of each of said compartments, substantially as described.

4. A settling device for filtering, comprising a tank in which are provided a number of compartments through which water flows successively, each of said compartments being provided with a channel-bottom and a curved end, suitable means for flushing said compartments, and suitable means for effecting a discharge from the bottom of each compartment, substantially as described.

5. A settling device for filtering, comprising a tank having a number of compartments, a top for said tank composed of I-beams B, hollow tiles between some of the beams and located over some of the compartments, and glass plates or lenses between the other beams and over the other compartments whereby the action of the sun's rays may be had on the liquid in such compartments, substantially as described.

6. A settling device for filtering, comprising successive compartments of varying size and a screen located near the bottom of each compartment so as to have a space below it in which impurities may settle, substantially as described.

In testimony whereof I have signed my name to this specification in the presence of two subscribing witnesses.

JOHN WILSON.

Witnesses:
   W. LAIRD GOLDSBOROUGH,
   GEO. E. CRUSE.